United States Patent
Bummel et al.

(10) Patent No.: US 9,180,808 B2
(45) Date of Patent: Nov. 10, 2015

(54) SYSTEM FOR CONTROLLING EXTERIOR LIGHTING OF A MOTOR VEHICLE

(71) Applicant: FORD GLOBAL TECHNOLOGIES, LLC, Dearborn, MI (US)

(72) Inventors: Sebastian Bummel, Cologne NRW (DE); Michael Alberti, Duesseldorf NRW (DE); Martin Scheck, Pulheim NRW (DE); Thomas Oeltjebruns, Dormagen-Straberg NRW (DE); Frank Aust, Neuss (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/446,955

(22) Filed: Jul. 30, 2014

(65) Prior Publication Data
US 2015/0035434 A1 Feb. 5, 2015

(30) Foreign Application Priority Data
Aug. 1, 2013 (DE) .................. 10 2013 215 103

(51) Int. Cl.
| B60Q 1/26 | (2006.01) |
| B60Q 1/14 | (2006.01) |
| B60Q 1/00 | (2006.01) |
| B60Q 1/08 | (2006.01) |

(52) U.S. Cl.
CPC .............. *B60Q 1/0076* (2013.01); *B60Q 1/085* (2013.01); *B60Q 1/1423* (2013.01); *B60Q 2300/314* (2013.01)

(58) Field of Classification Search
USPC .............. 315/76–77, 80, 82; 362/613, 23.04, 362/23.1, 85, 465
See application file for complete search history.

(56) References Cited

U.S. PATENT DOCUMENTS

| 5,773,935 A * | 6/1998 | Wagner et al. .................. 315/77 |
| 5,994,844 A * | 11/1999 | Crawford et al. .............. 315/151 |
| 2003/0019734 A1* | 1/2003 | Sato et al. ..................... 200/317 |
| 2009/0290326 A1* | 11/2009 | Tiedje et al. .................... 362/85 |

FOREIGN PATENT DOCUMENTS

| DE | 102007063420 A1 | 6/2009 |
| DE | 102009000536 A1 | 8/2010 |
| EP | 1074429 A2 | 2/2001 |
| WO | 2006084536 A1 | 8/2006 |

* cited by examiner

*Primary Examiner* — Minh D A
(74) *Attorney, Agent, or Firm* — Frank A. MacKenzie; Brooks Kushman P.C.

(57) ABSTRACT

A system for controlling the exterior lighting of a motor vehicle has a switch unit having a rotary switch which can be rotated clockwise and counter-clockwise to sequentially activate a plurality of operating modes of the vehicle lights. The rotary switch is a continuously adjustable rotary encoder, and a plurality of indicator lights are arranged around the rotary encoder, each of the operating modes is respectively assigned a mode indicator light. The operating mode selected by the rotary encoder is displayed by the corresponding indicator light. The rotary encoder has a plurality of latched positions that correspond to the plurality of indicator lights.

12 Claims, 2 Drawing Sheets

SYSTEM FOR CONTROLLING EXTERIOR LIGHTING OF A MOTOR VEHICLE

CROSS-REFERENCE TO RELATED APPLICATIONS

This application claims foreign priority benefits under 35 U.S.C. §119(a)-(d) to DE 10 2013 215 103.9 filed Aug. 1, 2013, which is hereby incorporated by reference in its entirety.

TECHNICAL FIELD

The invention relates to a light switch unit and to a system for controlling the exterior lighting of a motor vehicle.

BACKGROUND

Light switch units for controlling the exterior lights of motor vehicles are frequently embodied as rotary switches. Such a rotary switch can be actuated to select from available modes of the exterior lights, for example the modes "OFF", "headlight ON", "parking light", "side light", and "automatic" or "AUTO." An "AUTO" mode refers to the vehicle lights being automatically switched on and off as a function of the ambient brightness.

The rotary switch is typically latched or locked mechanically in the respectively selected position. However, in practice this can lead to the exterior lights remaining unintentionally switched on after the vehicle is exited. Furthermore, a situation can occur in which the headlights are not switched on in situations in which they are required or remain unnecessarily switched on in other situations. Such situations may occur, in particular, in vehicles with LED daytime running light with a comparatively high light output, in which situations the driver is possibly given the impression, owing to the LEDs, that the dipped headlight is switched on.

Future Economic Commission for Europe (ECE) automobile regulatory standards may require automatic switching on and off of the vehicle headlights as a function of the current ambient brightness conditions. Furthermore, at any time manual activation or deactivation must be possible, for example, in situations in which the light sensor is not functionally capable. In this context, the problem occurs that in the case of a switch with respectively latched or locked switching positions there is no possibility of activating the vehicle headlights independently of the respectively selected light switch position. If, for example, the auto light is selected, it is difficult for the user to understand how the vehicle headlight can be switched off.

The scenarios described above either result in reduced vehicle availability (owing to a discharged battery), increased safety risks, increased fuel consumption, increased $CO_2$ emissions or failure to comply with future regulatory requirements.

DE 10 2009 000 536 A1 discloses a modular light switch unit for controlling lighting groups for a motor vehicle, in which light switch unit all the operator controls are embodied as pushbutton keys, wherein a main pushbutton key for switching the headlight on and off, which is enlarged compared to the other pushbutton keys, is surrounded by the other relatively small pushbutton keys. Using such pushbutton keys, which in contrast to conventional rotary, rocking or latching keys do not latch in a position which predefines an operating position of the assigned lighting mode, is intended to ensure that, for example when switching on the ignition of the motor vehicle, the control is operated in the "auto light" mode with the side light or headlight switched on as a function of the ambient light.

EP 1 074 429 B1 discloses a light switch unit, in which a rotary switch and at least two pressure switches, which are arranged essentially diametrically with respect to the rotary switch, are provided in order to form a direct relationship between the spatial arrangement and the function of the switches.

DE 10 2007 063 420 A1 discloses a method for switching off assistance light functions of motor vehicles, such as, for example, the rain light and the freeway light, in which selected assistance light functions (such as, for example, the tunnel detection system and the dusk detection system) remain activated.

WO 2006/084536 A1 discloses a method for activating headlights of a motor vehicle, in which method a manual mode with manual activation of the headlights by means of a selector lever and an automatic mode for activating the headlights on the basis of an exterior lighting situation are provided, wherein in the automatic mode an override possibility is provided, with the result that the headlights can be changed into the corresponding lighting state by manual activation of the selector lever independently of the exterior lighting situation.

SUMMARY

An object of the present invention is to make available a light switch unit and a method for controlling the exterior lighting of a motor vehicle, which light switch unit and method permit, whenever the vehicle electrical system is switched on, automatic resetting to a predefined setting, and in this context may be readily understood and easy to operate by the user.

A light switch unit for a motor vehicle as disclosed herein has a rotary switch which can be rotated into different positions in order to activate different lighting modes of the motor vehicle. This rotary switch is configured as a continuously adjustable rotary encoder, each of the lighting modes being respectively assigned a mode indicator, and the mode which is activated in the current state being indicated by the respectively assigned mode indicator since in each case a mode indicator is made available for each selectable lighting state.

The present invention is based in particular on the concept of using, for the actuation of the different modes of the exterior lighting of a vehicle, a rotary encoder or encoder which has latching or detent positions but is configured as a continuously adjustable rotary controller without an end stop.

Since the rotary switch disclosed herein is configured as a continuously adjustable rotary encoder ("360° actuator") and the status of the active/selected lighting mode is signaled by the state of the respective mode indicator, the individual modes are not each logically linked to a specific permanently locked position of the rotary switch. As a result, the possibility is provided of the vehicle electrical or lighting system being started again at any time in the automatic (AUTO) mode when the ignition or the vehicle electronics are switched on regardless of the lighting mode which was active previously at power-off. The active AUTO mode is then signaled by the corresponding lighting mode indicator, for example by lighting up. The exterior lighting of the vehicle is then switched on and off on the basis of the ambient brightness conditions in the surroundings.

The switch unit disclosed herein therefore provides a control system enabling automatic return of the lights to a predefined default mode (for example automatic lighting) whenever the vehicle electronics are switched on. This is made possible as disclosed herein by virtue of the fact that the individual lighting modes are not each logically linked to a specific fixed rotary position of the rotary switch, but instead the currently activated lighting mode is signaled by the corresponding mode indicator (for example the lighting state thereof).

The disclosed light switch unit also makes available a control interface, which is easily comprehensible for the user, for activating the exterior lighting.

The inventive design of a light switch unit includes the use of a rotary encoder (rotary switch) which has a multiplicity of fixed or detented positions. By rotating the rotary encoder in the clockwise direction or alternatively in the counterclockwise direction, it is possible to select or activate other modes of the exterior lighting. The selected active mode can be signaled by lighting a indicator directly adjacent to the respective symbol or else by lighting the symbol itself, the respective indicator being able to go either from the switched-off state into the switched-on state or change its color here.

According to one embodiment, the rotary switch has in each case one latched or detented position for each individual lighting mode of the lighting modes.

The invention also relates to a method for controlling the exterior lighting of a motor vehicle with a light switch unit, this light switch unit having a rotary switch which can be rotated into different positions in order to activate different lighting modes of the motor vehicle.

In this context, a continuously adjustable rotary encoder is used as the rotary switch, each of the lighting modes being respectively assigned a mode indicator, and the respectively active lighting mode being displayed by the associated mode indicator.

According to one embodiment, when the vehicle electronics are switched on, a "auto light" lighting mode is automatically activated in which vehicle lights of the motor vehicle are switched on and off automatically as a mode of the ambient brightness.

Further refinements of the invention can be found in the description and the dependent claims.

The invention will be explained below on the basis of a preferred embodiment and with reference to the appended figures, of which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and modeal details disclosed herein are not to be interpreted as limiting, but merely as a representative basis for teaching one skilled in the art to variously employ the present invention.

Figure 1:
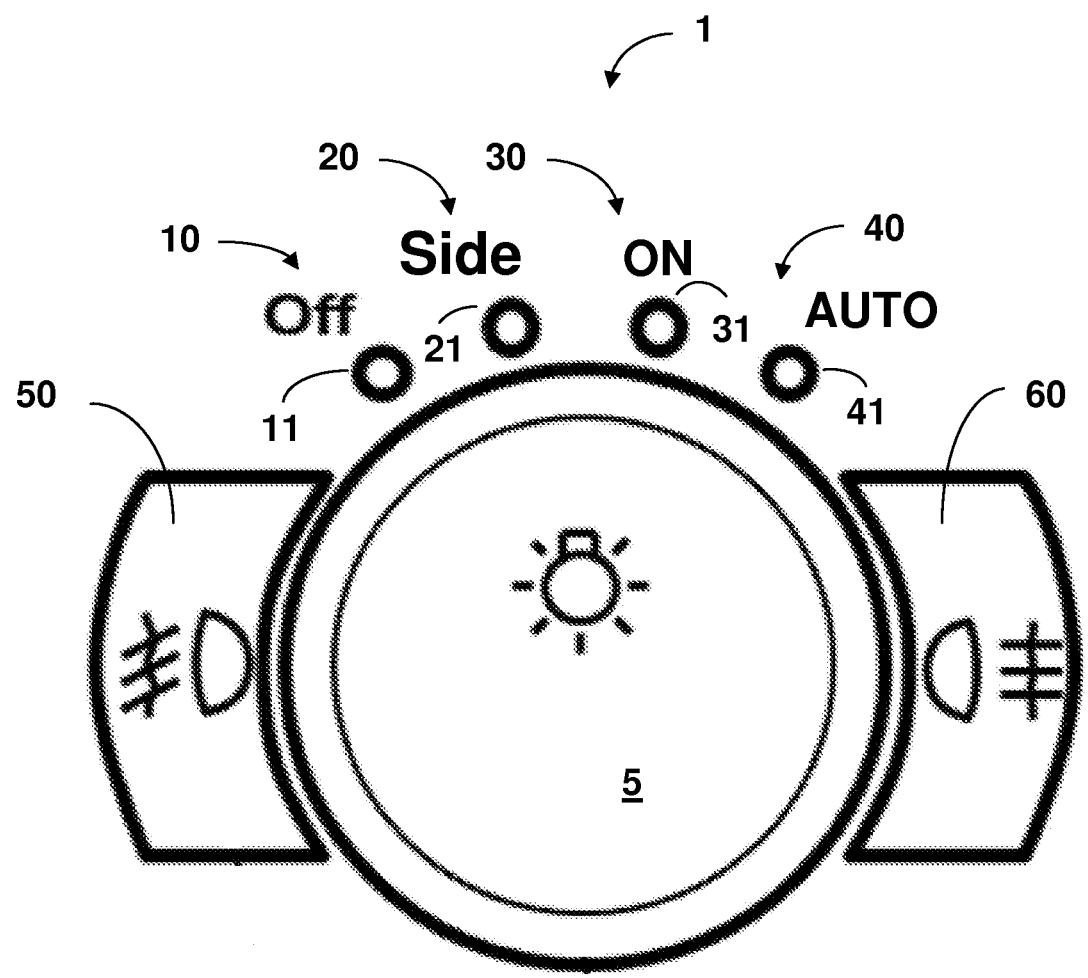
FIG. 1 shows a schematic illustration explaining the design of a light switch unit according to one embodiment of the invention.

According to FIG. 1, a light switch unit 1 for a motor vehicle has a rotary switch 5 which can be rotated into different positions in order to activate different lighting modes of the motor vehicle. However, in the exemplary embodiment, for example, the lighting modes "off" ("10" in FIG. 1), "side light" ("20" in FIG. 1), "ON" ("30" in FIG. 1), and "auto" ("40" in FIG. 1) can be actuated, without the invention being limited thereto, vehicle lights of the motor vehicle being switched on and off automatically as a function of the ambient brightness when the lighting mode when the "auto" mode 40 is activated. Furthermore, the switch unit 1 has a plurality of mode indicators 11, 21, 31 and 41, an indicator being respectively assigned to each of the lighting modes 10-40.

In addition, in the illustrated exemplary embodiment of the light switch unit 1, a pushbutton key 50 for activating the front fog lights and a further pushbutton key 60 for activating the tail lights are also present (without the invention being limited thereto).

The rotary switch 5 has one latched or detented position for each of the lighting modes but does not have an end stop in either rotational direction (clockwise or counter-clockwise) and is therefore configured as a continuously adjustable rotary encoder or as a "360° rotary encoder". The lighting mode (one of the lighting modes 10-40) which is currently activated is displayed by a lighting state of the respectively assigned mode indicator 11, 21, 31 and 41. For this purpose, the respective mode indicator 11, 21, 31 and 41 can, for example, go from a non-illuminated state into an illuminated state or the light color of the respective mode indicator 11, 21, 31 or 41 can change starting from an already illuminated state.

The connection or communication of the rotary encoder with an exterior lighting control unit (ELCU) of the motor vehicle can be carried out here via a network interface using an automobile communication protocol (such as, for example, LIN or CAN or Flexray) or alternatively using a hard-wired interface.

The disclosed configuration of the switch unit provides the ability of an ELCU controlling or activating the automatic lighting when the vehicle electronics are switched on, independently of the rotary switch 5. The system can therefore change automatically and independently into the automatic mode. In this case, the mode indicator light of the lighting mode 40 ("auto") is illuminated, with the result that the driver is informed about the active state.

Figure 2:
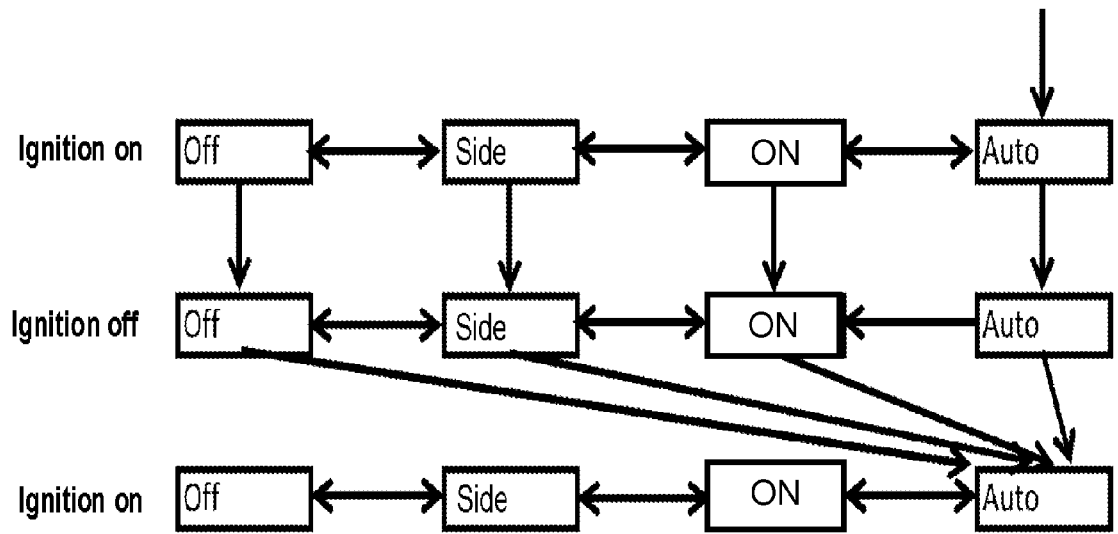
FIG. 2 shows a logic diagram explaining the switching logic implemented by the light switch unit in FIG. 1 for the activation of the individual lighting modes.
Figure 3:
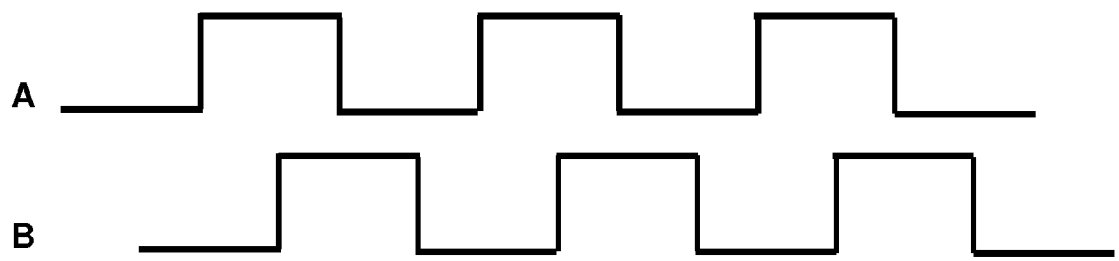
FIG. 3 shows a diagram explaining the signal profile made available by the inventive rotary encoder of the light switch unit in FIG. 1.

FIG. 2 shows a logic diagram explaining the switching logic implemented by the switch unit 1 in FIG. 1 for the activation of the individual lighting modes 10-40. When the ignition is switched on, the driver of the motor vehicle can switch over between the individual lighting modes 10-40 by rotating the rotary switch 5, it being possible to select a different lighting mode 10, 20, 30 or 40 depending on the rotational direction. As is apparent from FIG. 3, for this purpose two phase-shifted electric square-wave signals A and B are made available by the rotary encoder when the rotary switch 5 experiences a rotational movement. The result is that the square-wave signal A is trailing or leading with respect to the square-wave signal B depending on the rotational direction, and it is therefore possible to differentiate between the two rotational directions of the rotary switch 5.

If the driver would like to change the lighting mode 10-40 or the state of the headlights or some other change is necessary, the rotary switch 5 can be rotated in the direction corresponding to the desired mode. The symbol of the respective lighting mode 10, 20, 30 or 40 informs the driver as to the direction in which he must rotate the rotary switch 5. As soon as the respective lighting mode 10, 20, 30 or 40 is activated, the assigned mode indicator 11, 21, 31 or 41 for the respective lighting mode is illuminated.

However, as is apparent from FIG. 2, whenever the vehicle electronics or the ignition of the motor vehicle is initially switched on, the "auto" lighting mode 40 is automatically activated. As a result, the exterior lighting of the vehicle is switched on or off on the basis of the brightness conditions in the surroundings independently of the lighting mode last selected (i.e. the mode that was active when the engine or motor or the ignition of the motor vehicle was switched off). This is made possible by the fact that the individual lighting modes 10-40 are not each logically linked to a specific rotary position of the rotary switch 5, but instead the currently activated lighting mode 10, 20, 30 or 40 is signaled by the lighting state of the corresponding mode indicator 11, 21, 31 or 41.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a rotary encoder continuously rotatable in a clockwise and a counter-clockwise direction to implement switching logic sequentially activating each mode of a plurality of operating modes of a vehicle exterior light; and
    a plurality of indicator lights arranged around the rotary encoder and corresponding to the respective modes, an activated mode selected by the rotary encoder being displayed by the corresponding indicator light.

2. The system of claim 1, wherein the rotary encoder has a latched position corresponding to one of the plurality of indicator lights.

3. The system of claim 1, wherein one of the operating modes is an "AUTO" mode in which the light is switched on and off automatically as a function of ambient brightness.

4. The system of claim 1, further comprising a pushbutton key for activating a fog lamp.

5. The system of claim 1, wherein the switching logic is further operative to activate a desired initial mode of the plurality of modes when vehicle power is switched on.

6. A control system for a vehicle exterior light comprising:
    a continuously adjustable rotary encoder implementing switching logic to sequentially activate each of a plurality of operating modes of the light as the rotary encoder is rotated in either a clockwise or a counter-clockwise direction; and
    a plurality of indicator lights arranged around the rotary encoder, one of the plurality of indicator lights assigned to a respective one of the operating modes, and an activated state selected by the rotary encoder being indicated by the respectively assigned indicator light.

7. The control system of claim 6, wherein the rotary encoder has a latched position corresponding to one of the plurality of indicator lights.

8. The control system of claim 6, wherein one of the operating modes is an "AUTO" mode in which the light is switched on and off automatically as a function of ambient brightness.

9. The control system of claim 6, further comprising a pushbutton key for activating a fog lamp.

10. The control system of claim 6, wherein the switching logic is further operative to activate a desired initial mode of the plurality of modes when vehicle power is switched on.

11. A control system for a vehicle head lamp comprising:
    a continuously adjustable rotary encoder rotatable in a clockwise and a counter-clockwise direction to implement switching logic sequentially activating each of an ON mode, an OFF mode, an AUTO mode, and a SIDE mode; and
    a plurality of indicator lights arranged around the rotary encoder and corresponding to each of the modes respectively, an activated mode selected by the rotary encoder being displayed by illumination of the corresponding indicator light, and a latched position of the rotary encoder corresponding to each one of the indicator lights, the switching logic activating the AUTO mode when vehicle power is switched on.

12. The control system of claim 11, further comprising a pushbutton key for activating a fog lamp.

* * * * *